Figure 1:
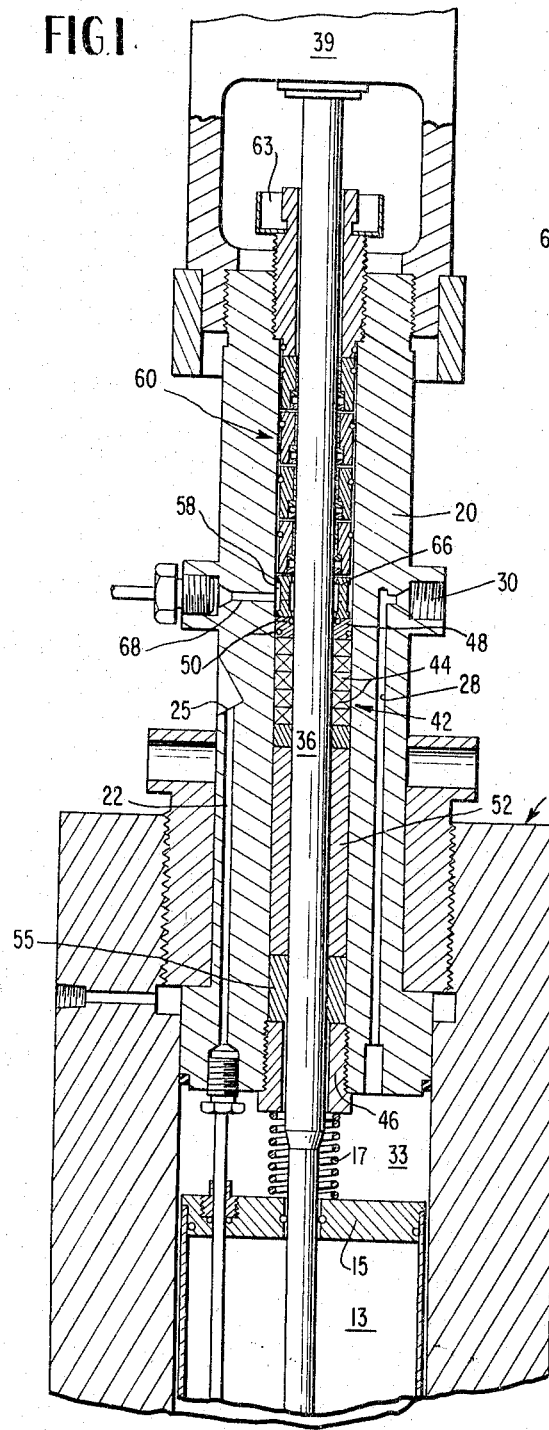

June 13, 1967  F. B. ALT  3,325,173

HIGH PRESSURE PACKING

Filed May 18, 1964

INVENTOR.
FRANK BENJAMIN ALT

BY C. Thomas Cross
ATTORNEY ated June 13, 1967

3,325,173
HIGH PRESSURE PACKING
Frank Benjamin Alt, Painesville, Ohio, assignor to Diamond Alkali Company, Cleveland, Ohio, a corporation of Delaware
Filed May 18, 1964, Ser. No. 368,136
1 Claim. (Cl. 277—59)

This invention relates to a novel shaft packing of particular utility where high pressure differentials between the ends of the shaft must be withstood. This invention provides a second, or pressure-drop, stage packing for a shaft having a first or sealing stage packing. The second stage packing, while providing lateral support for the shaft acts as a retaining mechanism for the first stage packing. The apparatus of this invention is of special use in packing the shaft of a stirrer used with an autoclave or other apparatus for high pressure chemical processes. Heretofore, although packings have been available to withstand pressures up to about 10,000 p.s.i., difficulties have been experienced at pressures higher than this. The improved packing used in this invention withstands pressures as high as 15,000 or even 20,000 p.s.i. The packing arrangement also provides lubrication for the shaft, Packing the shaft of stirrers for chemical reactors requires that a tight seal be achieved to prevent entry of foreign materials into the reactor and prevent escape of reactants, and without causing undue friction. Materials are known which are inert, so as to be unaffected by the reagents used in the process and not contaminative of the process. These materials can be fabricated so as to be resilient and deformable transversely to the axis of the shaft, and yet resist deformation in a direction coaxial with the shaft. Where extremely high pressure are directed against one side of even the best known sealing materials, however, there is a tendency for the sealing member to "creep" along the shaft or actually be blown out of the apparatus by the high pressure differential.

In this invention a second packing or retaining mechanism arrangement or stage is used to prevent displacement of the first stage material and to provide for a drop of pressure throughout the second stage which is graduated enough to prevent severe distortion of the second stage packing material. The second stage packing provides a pressure adjacent the first stage packing sufficient to prevent so great a pressure difference, across this first stage, that the first stage packing would be distorted. The second packing stage also maintains close contact with the shaft to prevent buckling or other distortion of the shaft itself and also provides for lubrication and cooling of the shaft. Whatever pressure differential is desired between the end of the second stage packing proximate the high pressure source, e.g., the reactor, and the remote end of the second stage packing, is achieved by the use of lubricant pressure, and the configuration and arrangement of the solid portions of the second stage packing provide a tortuous path for most of the lubricant, supplying a large but gradual pressure drop in a relatively short length and keeping the pressure drop across each member of the packing stage small enough to prevent significant distortion. In a preferred embodiment of this invention the packing member includes elements of limited compressibility which respond to an increment in pressure by directing more of the lubricant through a more tortuous path for an increase in the pressure drop obtainable.

In this invention solid packing rings, usually metallic, are used in the second stage which in their individual configuration and arrangement provide a tortuous, friction-ridden pathway for the lubricant, and preferably these rings may sometimes be substantially entirely surrounded by the lubricant. The packing material also provides small pockets of the lubricant to provide for and accommodate an even greater pressure drop. In the second stage packing, the rings may be identical or nearly so or at least be arranged in a simple alternating pattern for ease of replacement and minimization of manufacturing costs and inventory. The rings usually are not fixedly attached to each other but may be forced apart by lubricant under high pressure. This expansion of the second stage packing may have a squeezing effect on the first stage packing, thereby improving the sealing effect of this stage.

Figure 2:
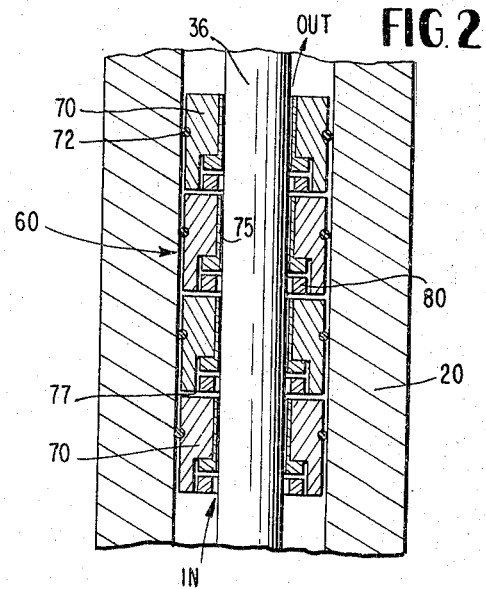
Figure 3:
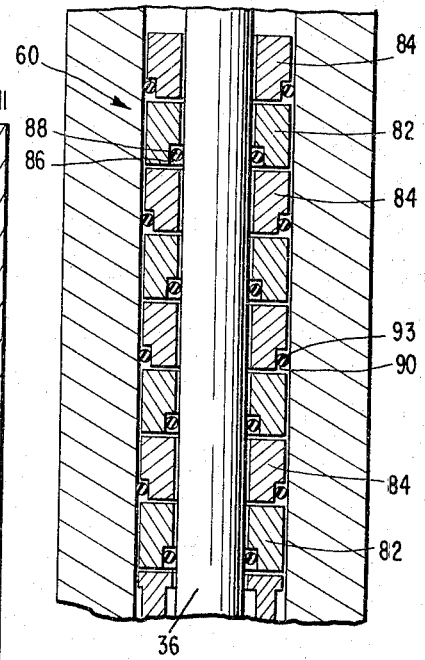

The first or sealing stage of this invention can comprise one or a plurality of materials which are chosen for their sealing and/or lubricating abilities, their resistance to deformation being of less importance because the pressure on these materials remote from the, for example, autoclave, need not be less than the pressure on them coming from the direction of the autoclave. Also, because of the lack of an extreme pressure differential in this stage, there is little tendency for the shaft to bow. The invention will be better understood from a consideration of the accompanying drawing in which FIGURE 1 is a cross-sectional view of the high pressure container or autoclave with the stirrer shaft and packing;

FIGURE 2 is a detailed cross-sectional view of the novel packing arrangement; and FIGURE 3 is a detailed cross-sectional view of a modified packing arrangement according to this invention.

In the drawing, the autoclave 11 has the interior chamber 13 wherein chemical reactions may be conducted under high pressure. This chamber may have the cover 15 which is held against internal pressure by the spring 17. The sleeve 20 forms the pressure resistant top for the autoclave 11 and this sleeve may be provided with the duct 22 used for introduction of reagents by way of opening 25 to the chamber 13. This duct may also be used for product removal. Likewise the duct 28, which has the opening 30, may be used for removal of fluid product or for the introduction of pressurizing fluid above the cover 15 in the space 33.

Sleeve 20 has a preferably central coaxial passageway which contains the shaft 36 which extends from the interior of the chamber 13 to the motor or other source of rotatory power 39. Shaft 36 is closely contacted by the sealing member 42 which, in the embodiment shown, is comprised of a plurality of packing rings 44. The sealing member is ideally made from a somewhat resilient material such as asbestos-filled polyfluoroethylene resin. This particular material has useful self-lubricating properties.

The sealing member is held in place at the bottom by the packing retaining nut 46 and at the top by the bushing 48. As shown, the packing retaining nut 46 does not have close contact with the shaft 36, and contact of the bushing 48 with the shaft 36 and the sleeve 20 can be minimized by the use of O-rings 50. The bushing 48 is, therefore, revolvable to some extent with the shaft 36. Where desired, a spacing element such as the stainless steel spacer 52 may be used and some spacing and lubrication also may be obtained by use of the graphite bearing support 55 for the shaft.

The second stage packing apparatus comprises a lubricant entry chamber 58, a series 60, of packing rings, and a lubricant efficient chamber 63. Chamber 58 is provided between the first stage packing 42 and the ring series 60 by any suitable means such as a bronze lantern ring 66. It will be noted that the first stage packing material is exposed to the pressure in the chamber 58. The chamber 58 is connected by duct 68 in the sleeve 20 with a source (not shown) of liquid lubricant usually under high pressure. Also, effluent chamber 63 is connected to a receiver for liquid lubricant, preferably a pump designed for recirculation of somewhat cooled oil to duct 68.

Ring series 60, in the preferred embodiment shown in FIGURES 1 and 2, comprises a plurality of rings 70, each of which is spaced from the interior wall of the sleeve 20 by means of an O-ring 72. Generally, the ring is made of metal, preferably of a deformation-resistant metal like Monel which can be provided with a bearing surface 75 of, for example, bronze. This bearing surface fits closely to the shaft 36 but leaves enough space for circulation of oil under pressure. Each ring 70, is cut away at its lower interior portion to provide the pocket 77 into which a metal, e.g., bronze, floating ring 80, of limited compressibility, is placed. As can be seen, the ring 80 does not fill the pocket 77 but instead may provide a space, preferably on all sides of the ring 80, in which lubricant can move. The floating ring 80, it will be understood, has a larger outside surface than its interior surface and thus the equal pressure exerted on all its sides by lubricant in the pocket 77, will result in a greater force on its outside peripheral surface than on its interior surface, tending to compress the rings. Thus an increase in pressure within the pocket 77 tends to restrict the passage between the shaft 36 and ring 80, forcing more of the lubricant flow through the more tortuous path around rather than through the ring 80 and providing for "using up" of this increased pressure. The principal oil flow in this embodiment is between the shaft 36 and the bearing surfaces 75 but, as can be seen, so many channels, dead ends, etc. are provided for the oil, that a pressure drop across each ring may be expected which is sizable enough to provide a considerable total drop between the oil inlet 58 and the outlet into effluent chamber 63 while not being so great across any one ring as to lead to deformation.

In the embodiment of FIGURE 3 a more tortuous path is provided for the lubricant through the second stage packing. In this embodiment the ring series 60 is made up of alternating ring types 82 and 84 which also may be made of bronze, bronze faced Monel, etc. Rings of the type 82 are cut away at the lower interior to provide pockets 86 for oil and resilient O-rings 88 while rings of the type 84 are cut away at the lower outside to provide pockets 90 for oil and resilient O-rings 93. In this embodiment, also, passages (not shown) are provided in the upper and/or lower surfaces of the rings 82 and/or 84, for transfer of the oil alternately from the interior of rings type 82 to the interior of rings type 84.

It can thus be seen that the aparatus of this invention provides means for packing a shaft whereby a second stage packing serves to limit the pressure differential applied to the first or sealing stage packing, and thus serves to retain the first stage material in place and without substantial axial deformation. The packing member of the second stage provides a tortuous path for a lubricant fluid held under the desired pressure differential, and can be made from a series of identical packing rings.

What is claimed:

A shaft packing arrangement suitable for withstanding a high pressure differential comprising:
 a shaft,
 a first stage packing in sealing contact with the shaft at the portion of the shaft proximate a source of high pressure on the shaft, and
 a second stage packing arrangement surrounding the shaft at a portion of the shaft remote from said source of high pressure;
 said second stage packing arrangement comprising:
  an inlet chamber adjacent said first packing stage for introduction of lubricant under high pressure,
  a series of deformation-resistant metal rings closely surrounding the shaft but allowing room for lubricant flow along the shaft under pressure and providing for lubricant to substantially completely surround said rings, and
  an outlet at a portion of the shaft remote from said high pressure source for exit of the lubricant, at substantially lower pressure than the inlet pressure;
  each of said metal rings having a cut away portion at its bottom to provide a pocket for lubricant and space for a radially compressible floating ring spaced from said cut away portion and said shaft providing a tortuous path for a greater portion of the lubricant around said compressible ring, said cut away portion having a depth greater than the thickness of the compressible ring,
  the configuration of said deformation-resistant and compressible rings providing a reduction in pressure of the lubricant across each ring of significant size to provide a substantial reduction in pressure between the inlet and outlet while not being great enough across any one ring to cause deformation of such ring.

References Cited

UNITED STATES PATENTS

| | | | |
|---|---|---|---|
| 448,874 | 3/1891 | Brewer | 277—1 |
| 1,567,750 | 12/1925 | Profitlich | 277—53 |
| 1,780,764 | 11/1930 | Noble | 277—123 |
| 1,787,317 | 12/1930 | Labus | 277—68 X |
| 1,788,496 | 1/1931 | Smith et al. | 277—68 |
| 2,201,471 | 5/1940 | Bostwick | 277—187 |

FOREIGN PATENTS 428,782   5/1935   Great Britain.

SAMUEL ROTHBERG, *Examiner*.